United States Patent
Kingsbury et al.

(10) Patent No.: US 10,627,895 B2
(45) Date of Patent: Apr. 21, 2020

(54) PROVIDING A VIRTUAL CONTROL (71) Applicant: LENOVO (Singapore) PTE. LTD., New Tech Park (SG)

(72) Inventors: Timothy Winthrop Kingsbury, Cary, NC (US); Matthew Jacyno, Fort Wayne, IN (US); Ryan Charles Knudson, Durham, NC (US); Christopher Donald Oman, Fort Wayne, IN (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 121 days.

(21) Appl. No.: 15/465,522

(22) Filed: Mar. 21, 2017

(65) Prior Publication Data

US 2018/0275744 A1 Sep. 27, 2018

(51) Int. Cl.
*G06F 3/01* (2006.01)
*G06F 3/0482* (2013.01)
*G06T 19/00* (2011.01)

(52) U.S. Cl.
CPC .............. *G06F 3/011* (2013.01); *G06F 3/016* (2013.01); *G06F 3/017* (2013.01); *G06F 3/0482* (2013.01); *G06T 19/006* (2013.01)

(58) Field of Classification Search
CPC ........ G06F 3/011; G06F 3/017; G06F 3/0346; G06F 3/04815; G06F 3/0482; G06F 3/0485

See application file for complete search history.

(56) References Cited

U.S. PATENT DOCUMENTS

| | | | | |
|---|---|---|---|---|
| 2011/0221656 A1* | 9/2011 | Haddick | .............. | G02B 27/017 345/8 |
| 2012/0309532 A1* | 12/2012 | Ambrus | ................ | G06F 3/0425 463/36 |
| 2015/0258431 A1* | 9/2015 | Stafford | ................ | A63F 13/213 463/31 |
| 2015/0302658 A1* | 10/2015 | O'Connor | ............... | G06F 3/011 345/633 |
| 2015/0309316 A1* | 10/2015 | Osterhout | ............... | G06F 3/012 345/8 |
| 2016/0093107 A1* | 3/2016 | Yamamoto | .............. | G06F 3/011 345/633 |
| 2016/0165170 A1* | 6/2016 | McRae | ................. | H04N 5/4403 348/734 |
| 2017/0249019 A1* | 8/2017 | Sawyer | ................ | G02B 27/017 |
| 2017/0357332 A1* | 12/2017 | Balan | ................. | G02B 27/0093 |
| 2018/0045963 A1* | 2/2018 | Hoover | ................... | G06F 3/011 |
| 2018/0157398 A1* | 6/2018 | Kaehler | ............. | G06F 3/04815 |

\* cited by examiner

*Primary Examiner* — Amy Ng
*Assistant Examiner* — Samuel Shen
(74) *Attorney, Agent, or Firm* — Kunzler Bean & Adamson (57) ABSTRACT

For providing a virtual control, a processor identifies a hand of a user forming a specified control activation position in a physical image of the augmented reality display. The processor further presents a virtual control with one or more virtual buttons in a virtual image in the augmented reality display in response to identifying the control activation position.

9 Claims, 12 Drawing Sheets

PROVIDING A VIRTUAL CONTROL

FIELD

The subject matter disclosed herein relates to providing a virtual control.

BACKGROUND

Description of the Related Art

Augmented reality displays provide both physical images and virtual images.

BRIEF SUMMARY

An apparatus for providing a virtual control is disclosed. The apparatus includes an augmented reality display, a processor, and a memory. The augmented reality display presents a physical image and a virtual image. The memory stores code executable by the processor. The processor identifies a hand of a user forming a specified control activation position in the physical image of the augmented reality display. The processor further presents a virtual control with one or more virtual buttons in the virtual image in the augmented reality display in response to identifying the control activation position. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
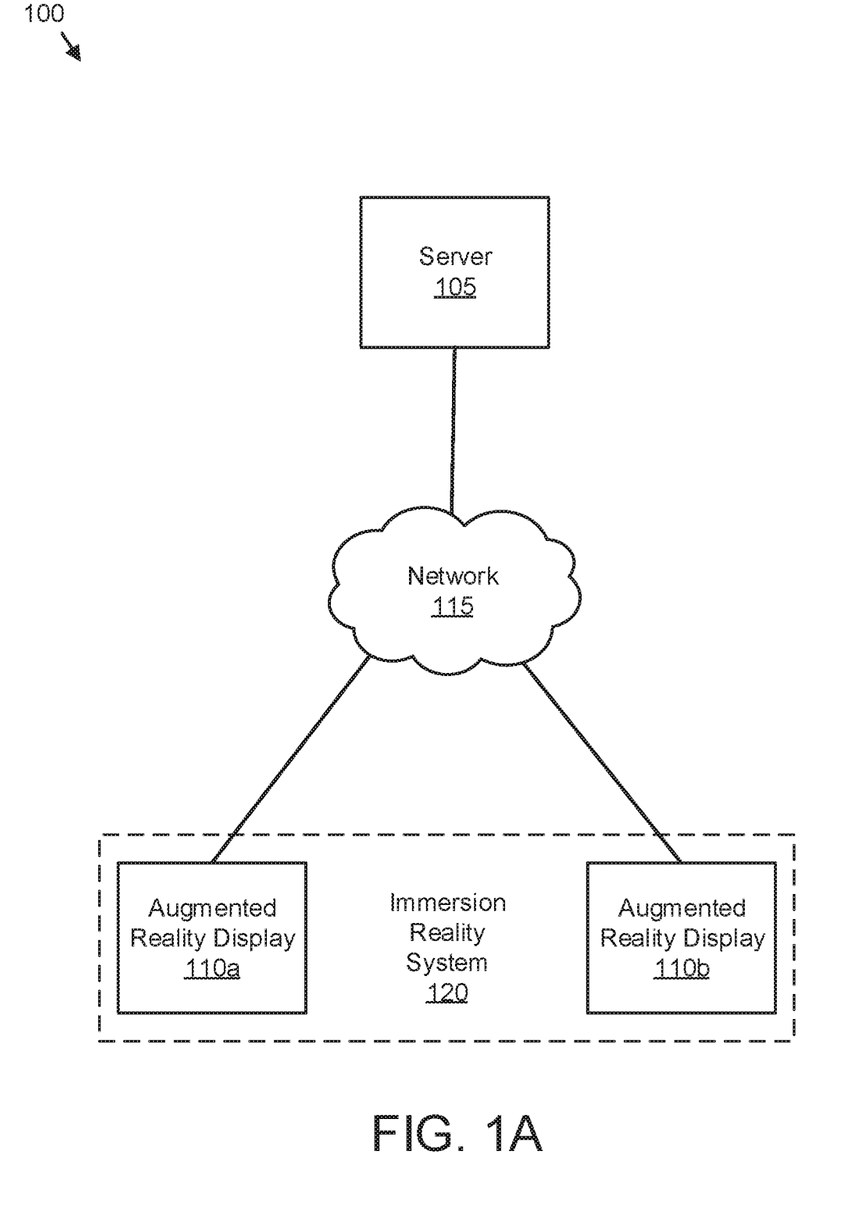
FIG. 1A is a schematic block diagram illustrating one embodiment of an augmented reality system.

FIG. 1A is a schematic block diagram illustrating one embodiment of an augmented reality system 100. The system 100 may provide an augmented reality experience for one or more users. In the depicted embodiment, the system 100 includes a server 105, a network 115, and one or more augmented reality displays 110. The augmented reality displays 110 may present both physical images and virtual images to users as illustrated hereafter in FIG. 1B.

The network 115 may comprise the Internet, a mobile telephone network, a Wi-Fi network, a wide-area network, a local area network, or combinations thereof. The server 105 may provide images, image geometries, audio, audio geometries, and the like through the network 115 to the augmented reality displays 110. The augmented reality displays 110 may present physical images and audio of the surrounding environment along with virtual images and audio that are generated from the images, image geometries, audio, and audio geometries. The physical images may be captured in real time by cameras. The users may interact with the virtual images along with the physical environment presented by the physical images. In one embodiment, the augmented reality displays 110 are embodied in an immersion reality system 120. The immersion reality system 120 may provide additional tactile and/or motion feedback to the users.

The user may wish to control aspects of the physical environment and/or the virtual images and audio that are presented through the augmented reality displays 110. For example, the user may wish to increase the volume of an audio feed. In addition, the user may wish to control the physical environment by lowering the temperature in the room. However, providing a physical control may be impractical as the user interacts with the physical environment and the virtual environment. In addition, providing a persistent virtual control may clash with an immersive experience.

The embodiments described herein identify a hand of the user forming a specified control activation position. The hand in the control activation position may be in the physical image of the augmented reality display. The embodiments further present a virtual control in the virtual image of the augmented reality display 110 in response to identifying the control activation position. As a result, the user can summon the virtual control at will, but otherwise the virtual control need not be presented in the augmented reality display 110 as will be described hereafter.

Figure 1B:
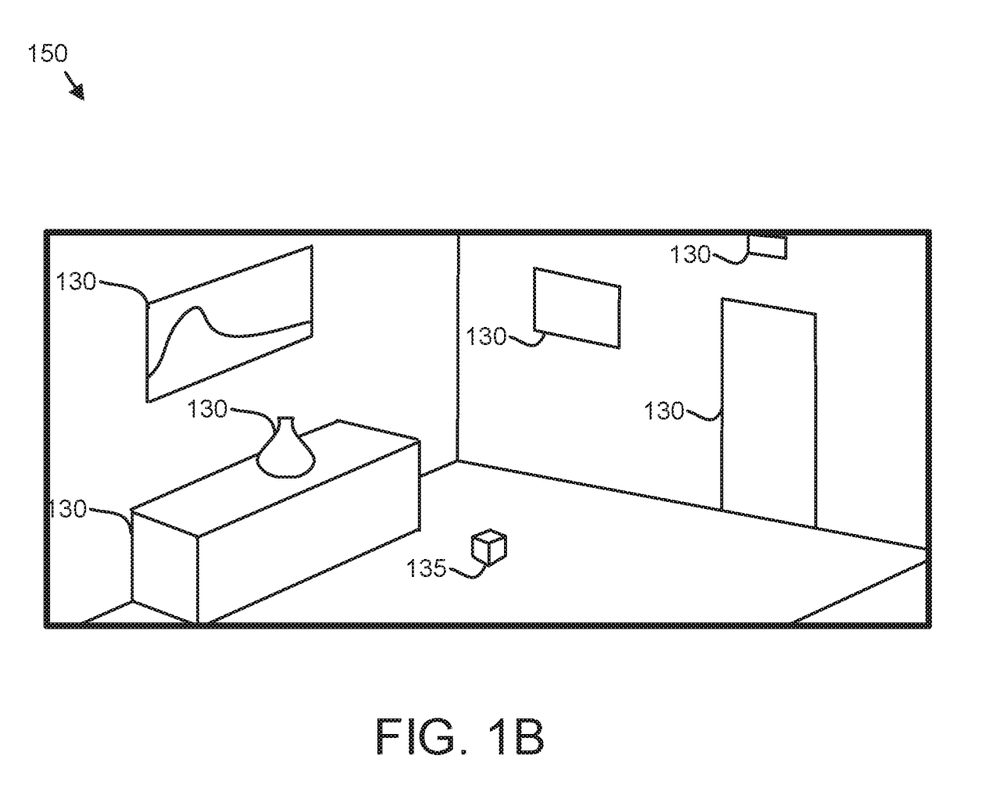
FIG. 1B is a drawing illustrating one embodiment of an augmented reality display presentation.

FIG. 1B is a perspective drawing illustrating one embodiment of an augmented reality display presentation 150. The presentation 150 may be displayed in goggles, a headset, wall displays, or combinations thereof. The presentation 150 includes a plurality of physical images 130 of objects in the physical environment viewed by a camera of the augmented reality display 110. In addition, the presentation 150 may include one or more virtual images 135 that are generated and rendered by the augmented reality display 110.

Figure 2:
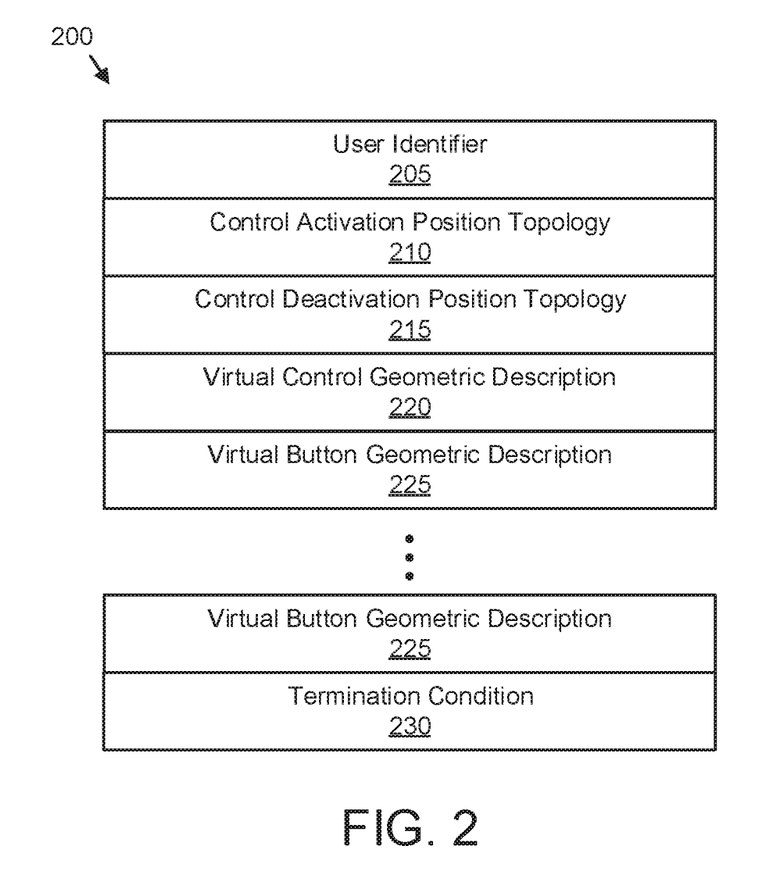
FIG. 2 is a schematic block diagram illustrating one embodiment of augmented reality data.

FIG. 2 is a schematic block diagram illustrating one embodiment of augmented reality data 200. The augmented reality data 200 maybe organized as a data structure in a memory. The augmented reality data 200 may reside in the server 105, the augmented reality display 110, or combinations thereof. In the depicted embodiment, the augmented reality data 200 includes a user identifier 205, a control activation position topology 210, a control deactivation position topology 215, a virtual control geometric description 220, one or more virtual button geometric descriptions 225, and a termination condition 230.

The user identifier 205 may identify the user and/or users associated with the augmented reality data 200. The augmented reality data 200 may be specific to a single user. Alternatively, the augmented reality data 200 may be available for multiple users.

The control activation position topology 210 may describe a topology of the user's body including specific body parts such as the hand. The entire body or portions thereof may be described. If the control activation position is identified using the control activation position topology 210, the augmented reality display 110 may present a virtual control. The control activation position topology 210 is described in more detail in FIG. 3A.

The control deactivation position topology 215 may describe topology of the user's body including specific body parts such as the hand. The entire body or portions thereof may be described. If a control deactivation position is identified using the control deactivation position topology 215, the augmented reality display 110 may stop presenting the virtual control.

In one embodiment, the control deactivation position topology 215 is any position other than the control activation position topology 210. In alternate embodiment, the control deactivation position topology 215 is formed if the hand that formed the control activation changes topology to form a position comprising one or more of the palm down, a fist, and an index finger and thumb forming a circle.

The virtual control geometric description 210 may describe a geometry of a virtual controller that may be rendered by the augmented reality display 110. The virtual button geometric descriptions 225 may each describe the geometry of a virtual button that may be rendered on or adjacent to the virtual controller by the augmented reality display 110.

The termination condition 230 may describe conditions that when satisfied, indicate that presentation of the virtual control may be terminated. In one embodiment, the termination condition is the control deactivation position.

Figure 3A:
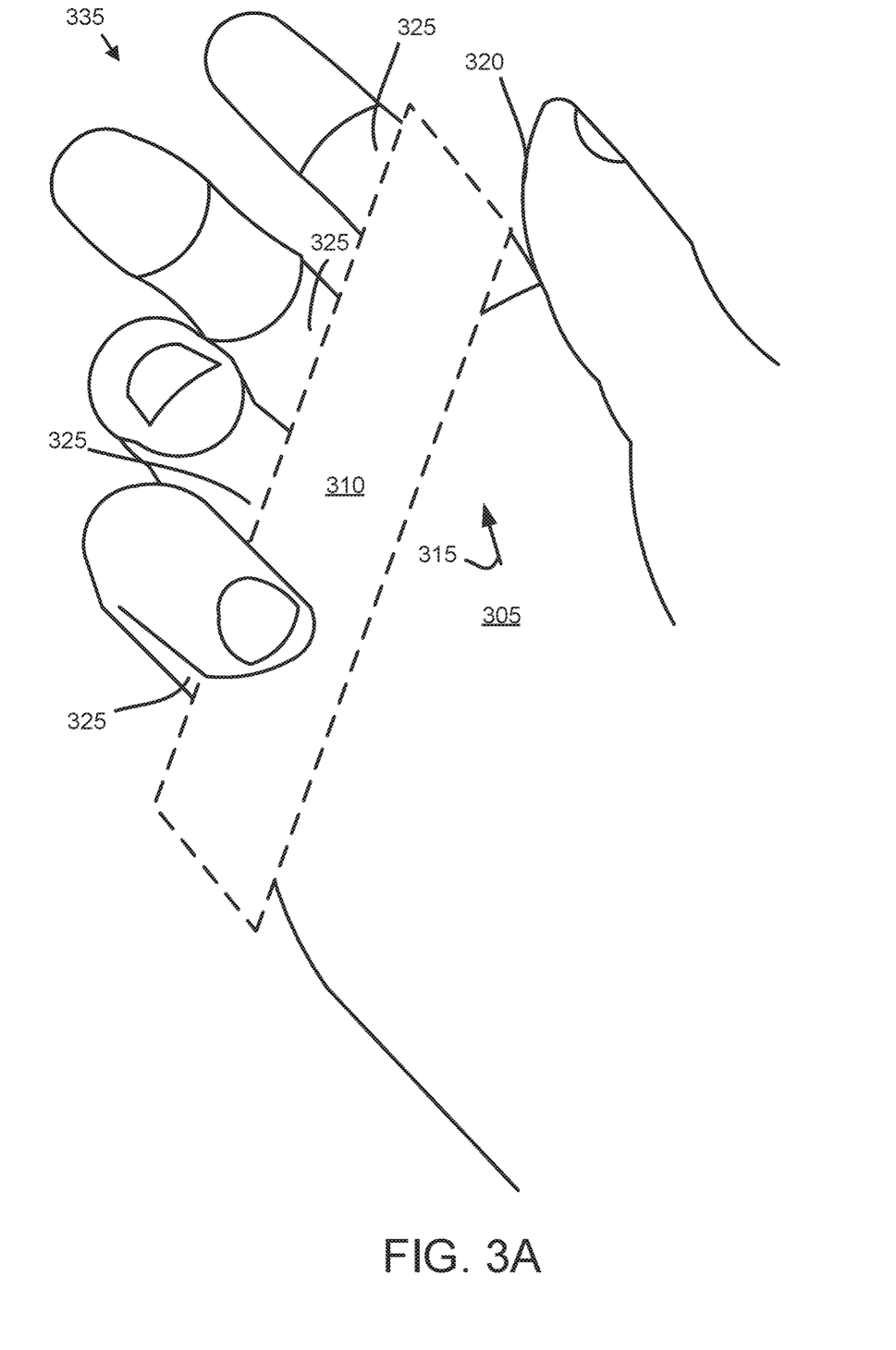
FIG. 3A is a drawing illustrating one embodiment of a control activation position.

FIG. 3A is a drawing illustrating one embodiment of a control activation position 335. In the depicted embodiment, a hand 305 is forming a control activation position 335. The control activation position 335 may be described by the control activation position topology 210.

In the depicted embodiment, the control activation position 335 comprises the hand 305 mimicking holding a remote control. In one embodiment, a normal 315 of a palm of the hand 305 is within 30 degrees of vertical up, fingers 325 of the hand 305 are curved with pads of two or more fingers 325 forming at least one first plane 310 within 30 degrees of perpendicular to the normal 315, and a pad of a thumb 320 is within 30 degrees of parallel to the first plane 310. Alternatively, the control activation position 335 may comprise the hand 305 pointing at a target virtual screen.

Figure 3B:
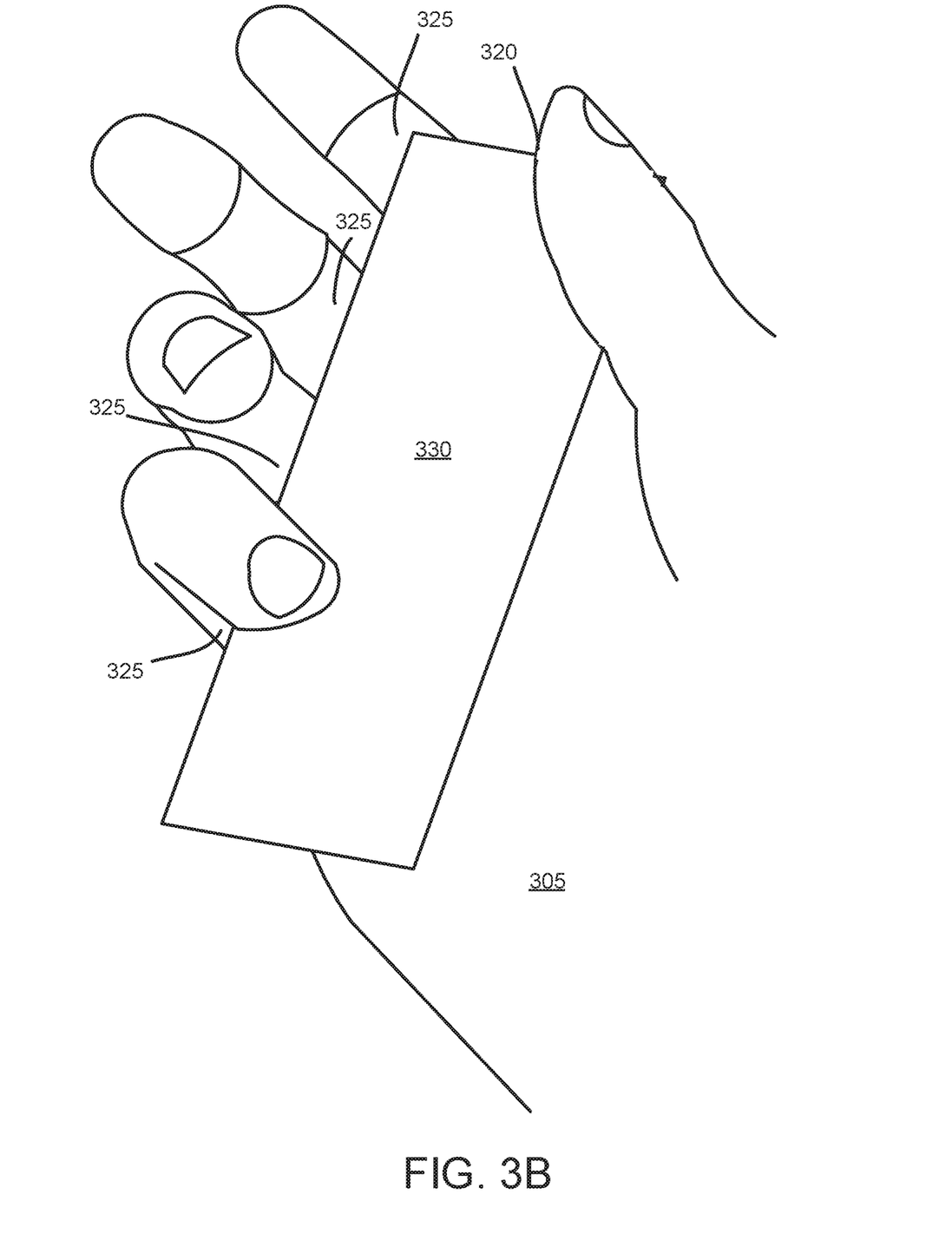
FIG. 3B is a drawing illustrating one embodiment of a virtual control.

FIG. 3B is a drawing illustrating one embodiment of a virtual control 330. In the depicted embodiment, the virtual control 330 is presented as a virtual remote control unit virtually held by the hand 305 in the control activation position 335. Embodiments of the virtual control 330 are described in more detail in FIGS. 3B-E.

The virtual control 330 may control one or more of a virtual presentation such as virtual image 135 and/or virtual audio and a physical device. The physical device may include one or more of lights, ceiling fans, HVAC, doors, fans, and windows. For example, the virtual control 330 may control of virtual presentation of virtual entertainment. In addition, the virtual control 330 may control the temperature of the room.

Figure 3C:
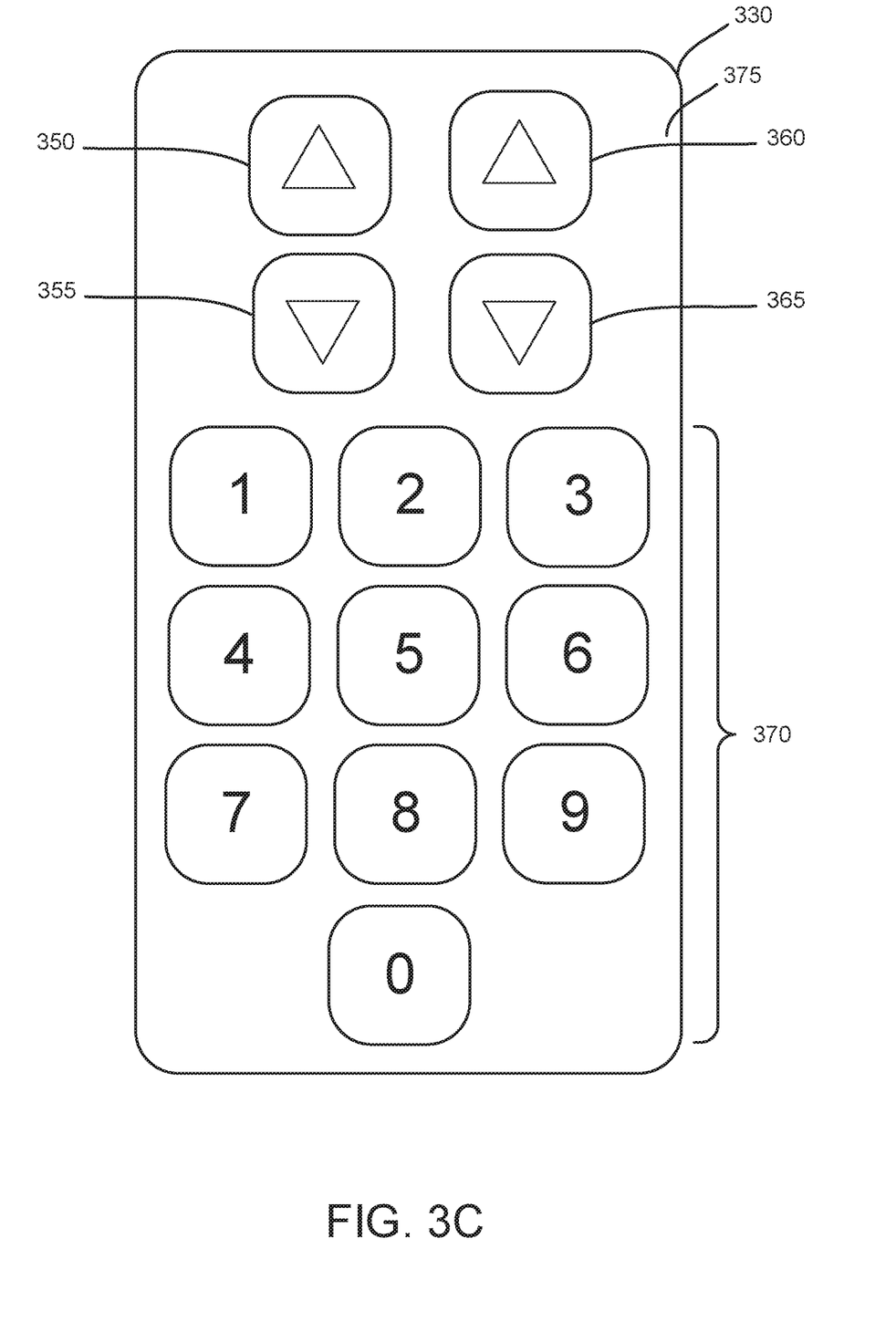
FIG. 3C is a front view drawing illustrating one alternate embodiment of a virtual control.

FIG. 3C is a front view drawing illustrating one alternate embodiment of a virtual control 330. The virtual control 330 may be presented as a virtual image 135 in the augmented reality display 110. In the depicted embodiment, the virtual control 330 includes the volume up button 350, the volume down button 355, the channel up button 360, the channel down button 365, and the one or more numerical buttons 370. In addition, the virtual control 330 may include a menu navigation button, an OK button, a back button, a home button, a play button, a fast-forward button, a rewind button, a pause button, a stop button, a select source button, and a sound configuration button which are not shown for simplicity. In one embodiment, the buttons are disposed on a virtual surface 375 that is virtually disposed within 15 degrees of perpendicular to the first plane 310.

Figure 3D:
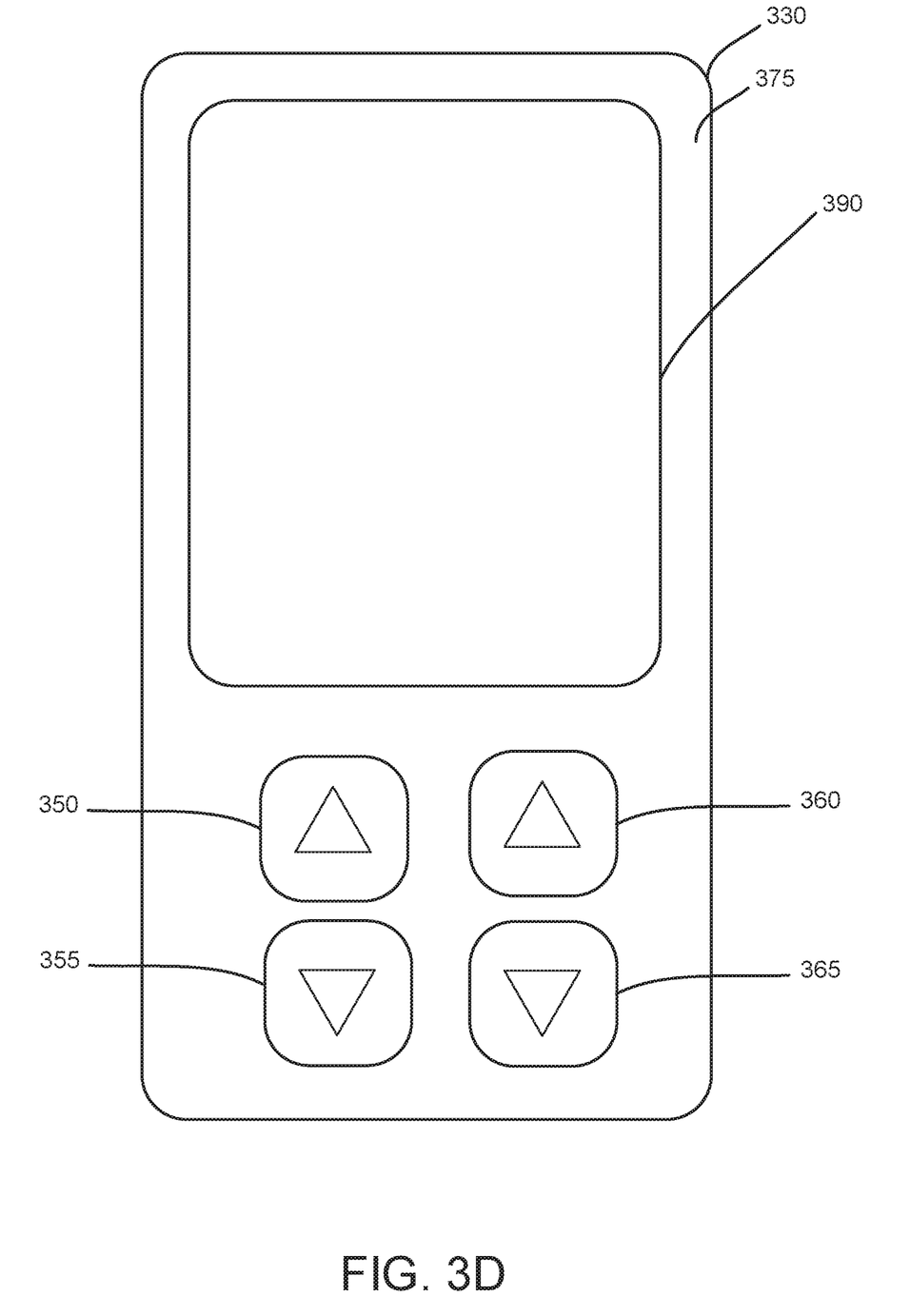
FIG. 3D is a front view drawing illustrating one alternate embodiment of a virtual control.

FIG. 3D is a front view drawing illustrating one alternate embodiment of a virtual control 330. The virtual control 330 may be presented as a virtual image 135 in the augmented reality display 110. In the depicted embodiment, the volume up button 350, the volume down button 355, the channel up button 360, the channel down button 365, and a menu 390 are presented on the virtual control 330.

Figure 3E:
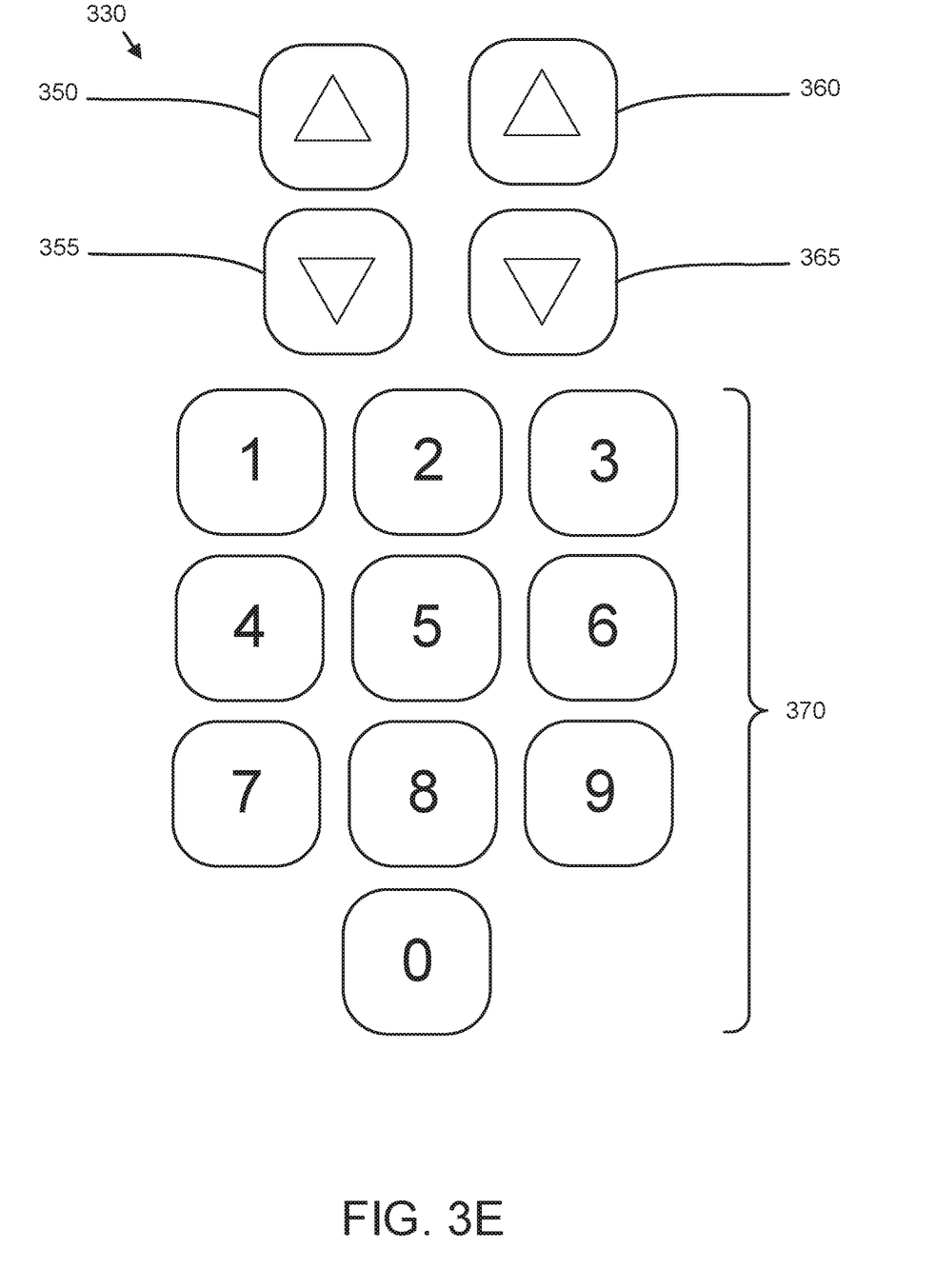
FIG. 3E is a front view drawing illustrating one alternate embodiment of a virtual control.

FIG. 3E is a front view drawing illustrating one alternate embodiment of a virtual control 330. In the depicted embodiment, the virtual control 330 is presented as a plurality of virtual buttons. Although for simplicity, the volume up button 350, the volume down button 355, the channel up button 360, the channel down button 365, and the one or more numerical buttons 370 are shown, any combination of buttons may be displayed. In one embodiment, the virtual control 330 is presented as a plurality of virtual buttons disposed within 45 degrees on the line of sight of the user.

Figure 3F:
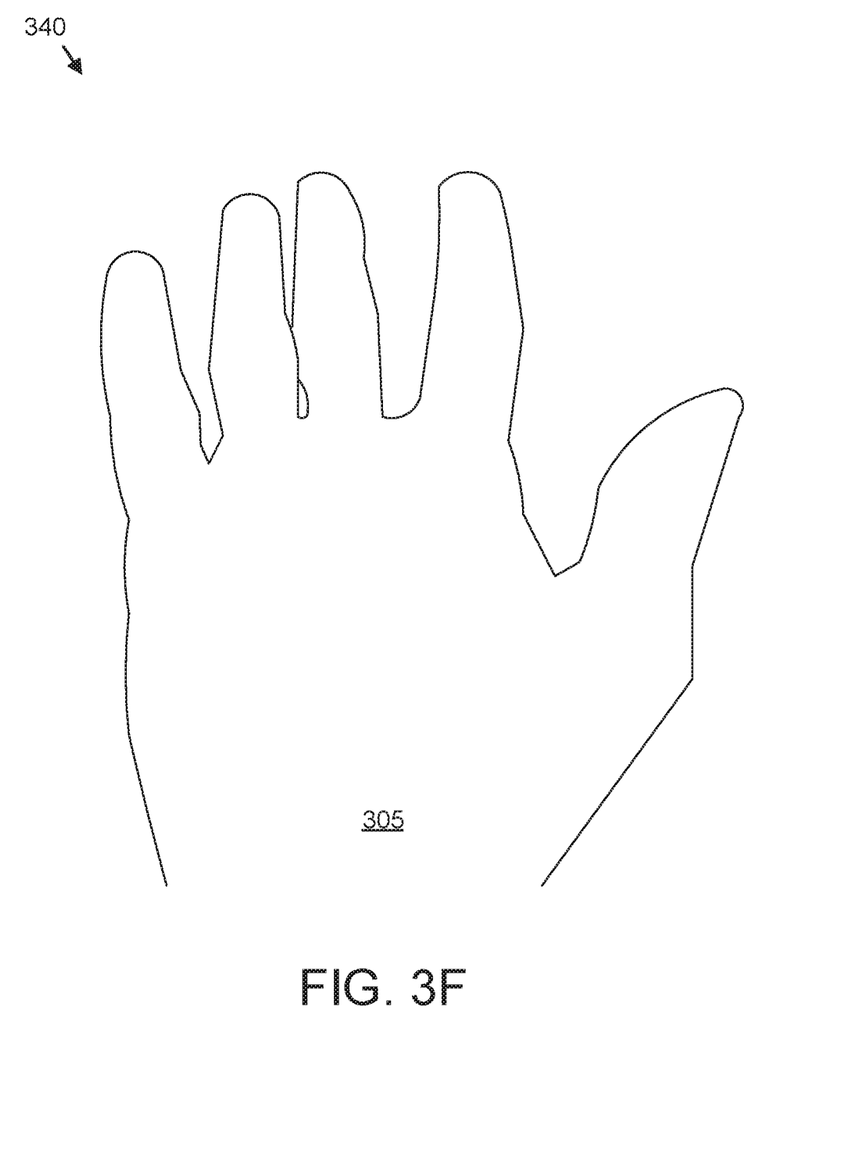
FIG. 3F is a drawing illustrating one embodiment of a control deactivation position.

FIG. 3F is a drawing illustrating one embodiment of a control deactivation position 340. In the depicted control deactivation position 340, the hand is relaxed from a control activation position 335 to form the control deactivation position 340. Other control activation positions 335 may also be used.

Figure 4:
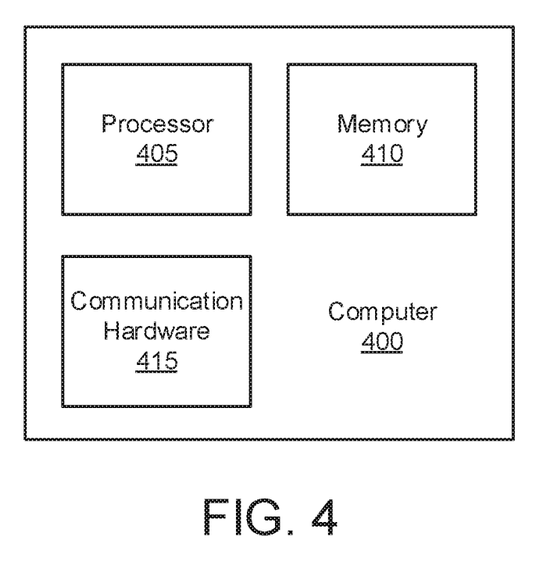
FIG. 4 is a schematic block diagram illustrating one embodiment of a computer.

FIG. 4 is a schematic block diagram illustrating one embodiment of a computer 400. The computer 400 may be embodied in the augmented reality display 110, the server 105, or combinations thereof. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices such as the network 115.

Figure 5A:
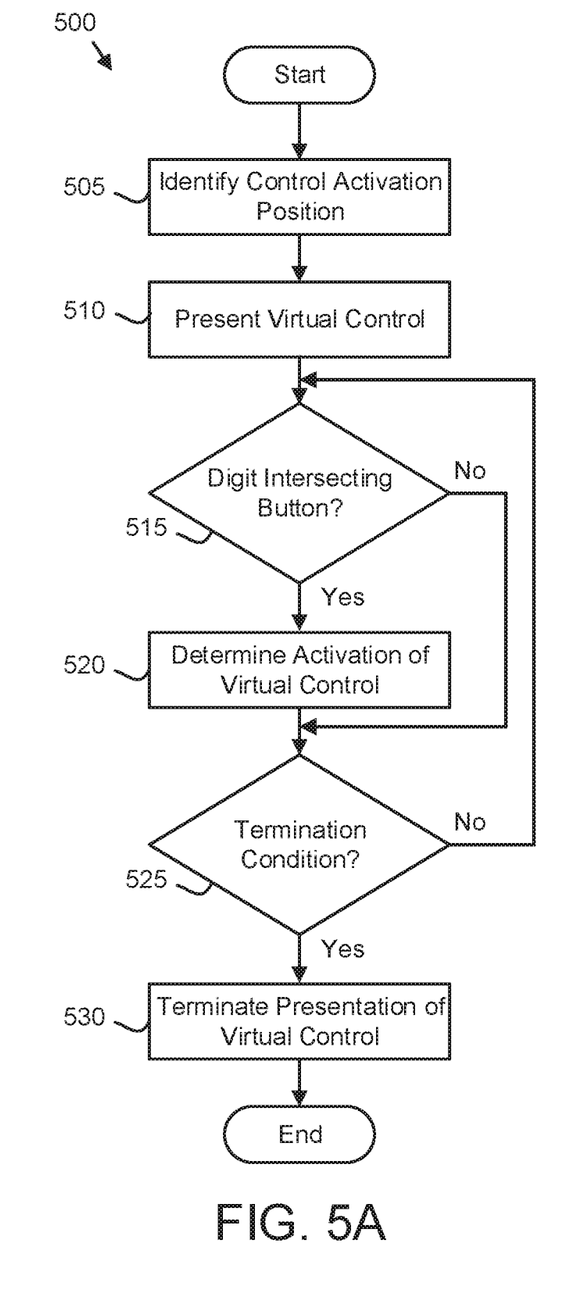
FIG. 5A is a schematic flow chart diagram illustrating one embodiment of a virtual control presentation method.

FIG. 5A is a schematic flow chart diagram illustrating one embodiment of a virtual control presentation method 500. The method 500 may identify a control activation position 335 formed by a hand 305 in the physical image 130 of the augmented reality display 110 and present a virtual control 330. The method 500 may be performed by the computer 400 and/or the processor 405 of the computer 400.

The method 500 starts, and in one embodiment, the processor 405 identifies 505 the hand 305 of the user forming a specified control activation position 335 in the physical image 130 of the augmented reality display 110. The control activation position 335 may be specified by the control activation position topology 210. The processor 405 may measure a topology of the hand 305 and compare the measured topology to the control activation position topology 210. In one embodiment, the processor 405 calculates a difference between the measured topology and the control activation position topology 210. The processor 405 may identify 505 the hand 305 forming the control activation position 335 if the difference between the measured topology and the control activation position topology 210 is less than a topology difference threshold.

The processor 405 may present 510 the virtual control 330 with one or more virtual buttons in the virtual image 135 in the augmented reality display 110 in response to identifying the control activation position 335. In one embodiment, the virtual control 330 is presented 510 as though disposed in the hand 305 in the control activation position 335. In addition, the virtual control 330 may be presented 510 as virtually positioned along the line of sight of the user. In one embodiment, the virtual control is presented 510 as virtually positioned above the hand 305.

In one embodiment, the virtual control 330 only controls one element that is presented by the augmented reality display 110. The element may be a physical image 130 of a physical object or device. In addition, the element may be a virtual image 135. The element may be identified by the control activation position 335 pointing towards the element. For example, the augmented reality display 110 may present two video display virtual images 135. If the user forms the control activation position 335 pointing towards the first video display virtual image 135, the virtual control 330 may only control the first video display virtual image 135.

Similarly, if the user forms the control activation position 335 pointing towards a window that is presented as a physical image 130 in the augmented reality display 110, the presented virtual control 330 may only control the physical window. In one embodiment, the element selected for control resides along a vector extending away from the user along the user's arm. The processor 405 may present a label for the virtual control 330. As the user points to different elements, the label and the virtual control 330 may change, allowing the user to select a desired virtual control 330.

The processor 405 may determine 515 if a digit comprising one or more of a finger 325 and a thumb 320 of the user intersects a first virtual button such as the volume up button 350. If the digit intersects the first virtual button, the processor 405 may determine 520 an activation of the first virtual button. The processor 405 may further perform a specified function in response to the activation of the first virtual button. If the digit does not intersect the first virtual button, or in response to determining 520 the activation of the first virtual button, the processor 405 may determine 525 if the termination condition 230 is satisfied. In one embodiment, the termination condition 230 is satisfied after determining the activation of the first virtual button. In addition, the termination condition 230 may be satisfied after a specified time interval such as 5-15 seconds. In one embodiment, the termination condition 230 is satisfied in response to identifying a control deactivation position 340 as will be described in more detail in FIG. 5B.

If the termination condition 230 is not satisfied, the processor 405 continues to determine 515 if the digit intersects a virtual button. If the termination condition 230 is satisfied, the processor 405 terminates 530 presentation of the virtual control 330 and the method 500 ends. In one embodiment, the augmented reality display 110 does not present the virtual control 330. In a certain embodiment, the virtual control 330 fades from view in the augmented reality display 110.

Figure 5B:
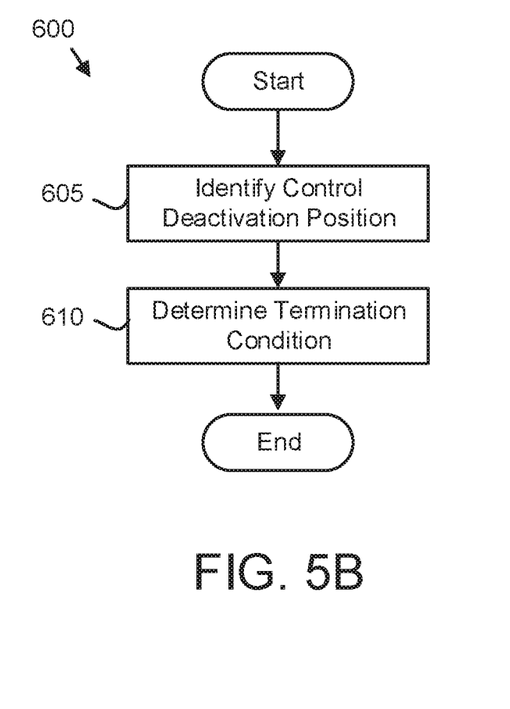
FIG. 5B is a schematic flow chart diagram illustrating one embodiment of a control deactivation position identification method.

FIG. 5B is a schematic flow chart diagram illustrating one embodiment of a control deactivation position identification method 600. The method 600 may identify the hand 305 forming the control deactivation position 340 and determine that the termination condition 230 is satisfied. The method 600 may be performed by the computer 400 and/or the processor 405 of the computer 400.

The method 600 starts, and in one embodiment, the processor identifies 605 the hand 305 of the user forming a specified control deactivation position 340. The control deactivation position 340 may correspond to the control deactivation position topology 215. In one embodiment, the control deactivation position comprises the hand relaxing from the specified control activation position 335.

The processor 405 may further determine 610 that the termination condition is satisfied in response to identifying 605 the control deactivation position and the method 600 ends. As a result, the processor 405 may terminate 530 presentation of the virtual control 330 as described in FIG. 5A.

By identifying the hand 305 of the user forming the control activation position 335 in the physical image 130 of the augmented reality display 110, the embodiments support the presentation of the virtual control 330 in the augmented reality display 110. As a result, the user may readily summon the virtual control 330 to control virtual presentations and/or physical devices. With ready access to the virtual control 330, the user realizes the full benefit of the augmented reality display 110 including an immersive experience, while still having ready access to the virtual control 330.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an augmented reality display that presents a physical image and a virtual image;
a processor;
a memory that stores code executable by the processor to:
identify a hand of a user forming a specified control activation position in the physical image of the augmented reality display, wherein in the control activation position, a normal of a palm of the hand is within 30 degrees of vertical up, all fingers of the hand, not including the thumb, are curved and not touching the palm with pads of two or more of the fingers forming at least one first plane within 30 degrees of perpendicular to the normal, and a pad of a thumb is within 30 degrees of parallel to the first plane, and wherein the hand holds no physical object; and
present a virtual control as a virtual remote control unit with one or more a virtual display that presents a menu and virtual buttons disposed on a virtual surface that is within 15 degrees of perpendicular to the first plane virtually held in the hand in the control activation position in the virtual image in the augmented reality display in response to identifying the control activation position, the virtual buttons comprising a user-customizable button, a volume up button, a volume down button, a channel up button, a channel down, one or more numerical buttons, a menu navigation button, an OK button, a back button, a home button, a play button, a fast-forward button, a rewind button, a pause button, a stop button, a select source button, and a sound configuration button.

2. The apparatus of claim 1, wherein the code is further executable by the processor to determine an activation of a first virtual button in response to a digit of the user intersecting the first virtual button.

3. The apparatus of claim 1, wherein the code is further executable by the processor to:
identify the hand of the user forming a specified control deactivation position; and
terminate presentation of the virtual control in response to the control deactivation position.

4. A method comprising:
identifying, by use of a processor, a hand of a user forming a specified control activation position in a physical image of an augmented reality display that presents the physical image and a virtual image, wherein in the control activation position, a normal of a palm of the hand is within 30 degrees of vertical up, all fingers of the hand, not including the thumb, are curved and not touching the palm with pads of two or more of the fingers forming at least one first plane within 30 degrees of perpendicular to the normal, and a pad of a thumb is within 30 degrees of parallel to the first plane, and wherein the hand holds no physical object; and
presenting a virtual control as a virtual remote control unit with a virtual display that presents a menu and virtual buttons disposed on a virtual surface that is within 15 degrees of perpendicular to the first plane virtually held in the hand in the control activation position in the virtual image in the augmented reality display in response to identifying the control activation position, the virtual buttons comprising a user-customizable button, a volume up button, a volume down button, a channel up button, a channel down, one ore more numerical buttons, a menu navigation button, an OK button, a back button, a home button, a play button, a fast-forward button, a rewind button, a pause button, a stop button, a select source button, and a sound configuration button.

5. The method of claim 4, the method further determining an activation of a first virtual button in response to a digit of the user intersecting the first virtual button.

6. The method of claim 4, the method further comprising:
identifying the hand of the user forming a specified control deactivation position; and
terminating presentation of the virtual control in response to the control deactivation position.

7. A program product comprising a non-transitory computer readable storage medium that stores code executable by a processor, the executable code comprising code to perform:
identifying a hand of a user forming a specified control activation position in a physical image of an augmented reality display that presents the physical image and a virtual image, wherein in the control activation position, a normal of a palm of the hand is within 30 degrees of vertical up, all fingers of the hand, not including the thumb, are curved and not touching the palm with pads of two or more of the fingers forming at least one first plane within 30 degrees of perpendicular to the normal, and a pad of a thumb is within 30 degrees of parallel to the first plane, and wherein the hand holds no physical object; and
presenting a virtual control as a virtual remote control unit with a virtual display that presents a menu and virtual buttons disposed on a virtual surface that is within 15 degrees of perpendicular to the first plane virtually held in the hand in the control activation position in the virtual image in the augmented reality display in response to identifying the control activation position, the virtual buttons comprising a user-customizable button, a volume up button, a volume down button, a channel up button, a channel down, one ore more numerical buttons, a menu navigation button, an OK button, a back button, a home button, a play button, a fast-forward button, a rewind button, a pause button, a stop button, a select source button, and a sound configuration button.

8. The program product of claim 7, the processor further determining an activation of a first virtual button in response to a digit of the user intersecting the first virtual button.

9. The program product of claim 7, the processor further performing:
   identifying the hand of the user forming a specified control deactivation position; and
   terminating presentation of the virtual control in response to identifying the control deactivation position.

\* \* \* \* \*